June 14, 1966  W. HALCO  3,255,977
FILM MAGAZINE WITH PULL STRIP
Filed Jan. 27, 1964  2 Sheets-Sheet 1
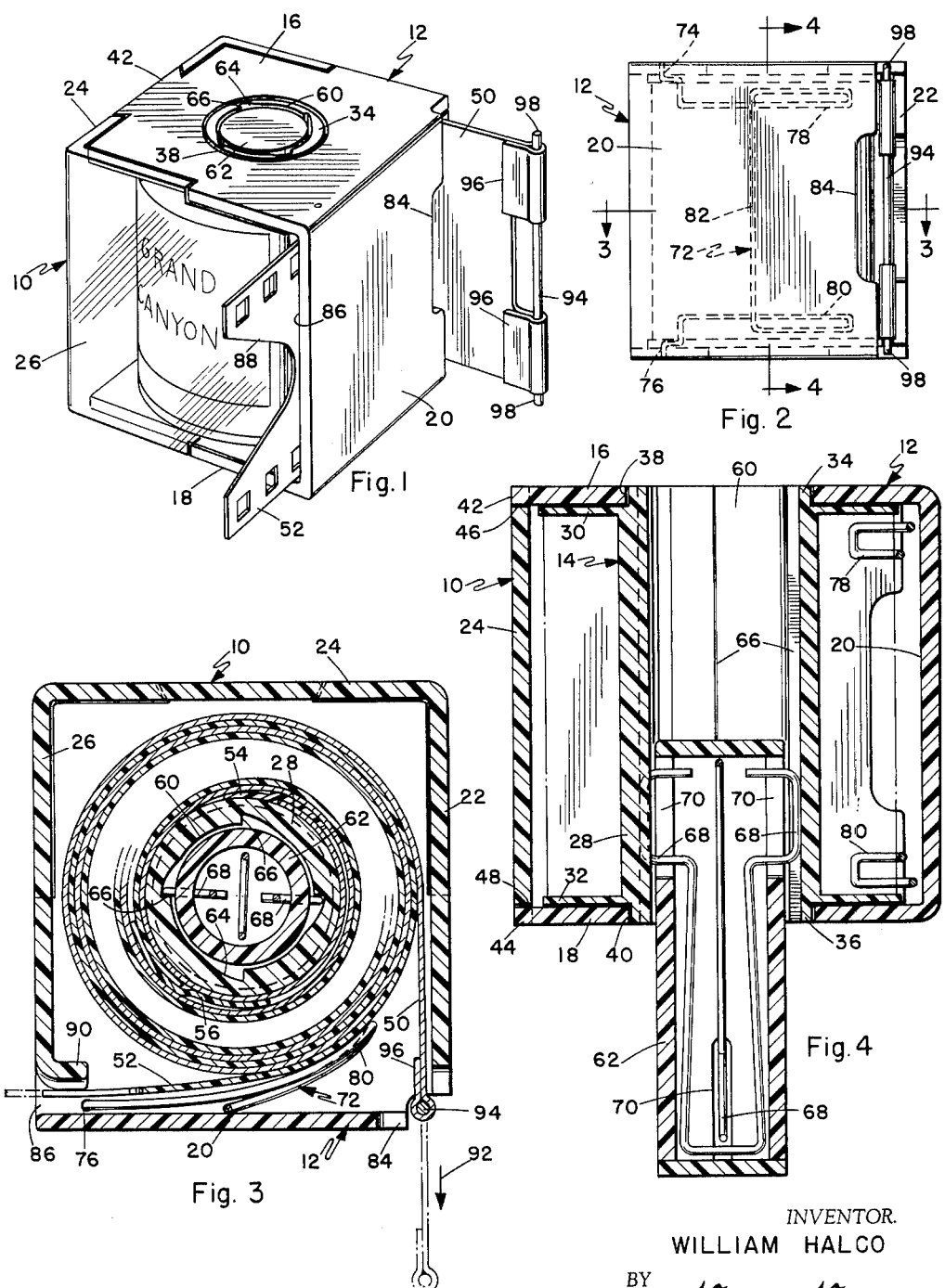
INVENTOR.
WILLIAM HALCO
BY Knox & Knox

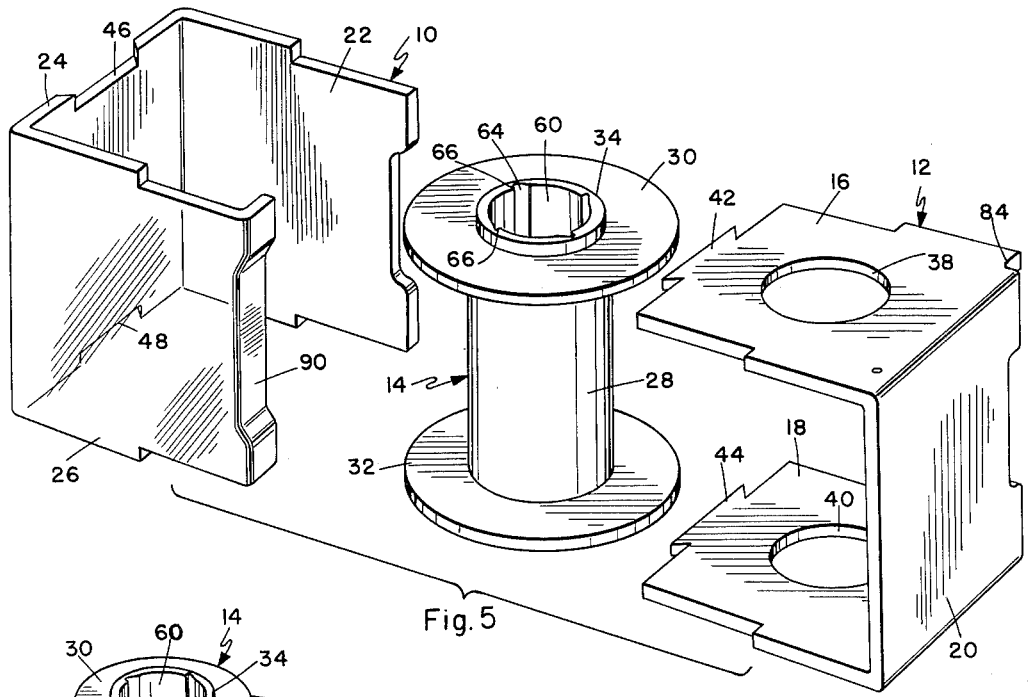
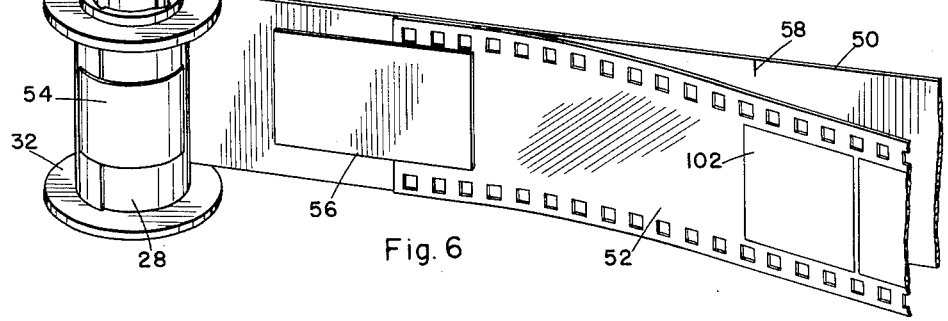
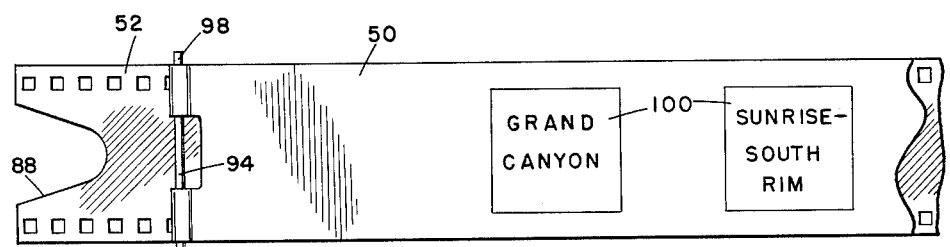

United States Patent Office 3,255,977
Patented June 14, 1966

3,255,977
FILM MAGAZINE WITH PULL STRIP
William Halco, 330 Broadway, Chula Vista, Calif.
Filed Jan. 27, 1964, Ser. No. 340,163
9 Claims. (Cl. 242—55)

The present invention relates generally to film magazines and more particularly to a film magazine which is designed for use with a stereo film strip viewer. In viewers of this type, the film having the stereo transparencies is usually wound on a spool and transported by a suitable means through the optical viewing system.

It is the primary object of this invention to provide an improved film magazine which utilizes a combined title and pull strip attached at one end to a flanged spool and having a pull bar at the other end and which, in addition to furnishing transparency titles and facilitating the loading and transport of the film through the optical system of a viewer, would serve also as a protective layer between the spooled film surfaces and thus eliminate the possibility of damage to picture areas from the abrasive action of the surfaces on each other during film advance and rewind.

It is a further object of this invention to provide suitable markings on the title and pull strip to facilitate attachment of film in proper position so that related frames and title come into view simultaneously with the use of appropriate equipment.

It is a still further object of this invention to provide in a film magazine of the aforementioned character an improved pull bar on the end of the combined title and pull strip to insure proper placement of the title of the magazine content. This pull bar will also facilitate a tight rewind of the film and combined pull and title strip so that maximum protection against damage to color pigments by atmosphere and light is afforded.

It is a further object of this invention to provide, in a film magazine of the aforementioned character, a flanged spool for carrying the film and combined pull and title strip having a rewind shaft engaging the spool through a one-way clutch thereby eliminating damage to film by rewinding in the wrong direction.

It is a still further object to provide, in a film magazine of the aforementioned character, an improved spring to guide the film as well as provide tension on the pull and title strip thereby preventing unintentional unwinding of the strip and insuring accurate alignment of frames and titles by eliminating possibility of slack in the film.

Finally it is an object to provide a film magazine of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of the disclosure, and in which:

FIGURE 1 is a perspective view of the film magazine with the combined pull and title strip and film strip partially extended therefrom;

FIGURE 2 is an elevation view of one side of the film magazine;

FIGURE 3 is a sectional view taken on the line 3—3 of FIGURE 2;

FIGURE 4 is a sectional view taken longitudinally on the axis of the spool showing the rewind shaft in extended position for rewinding;

FIGURE 5 is an exploded view showing the housing and spool before assembly;

FIGURE 6 is a view showing the attachment of the film strip to the combined pull and title strip and the attachment of the latter to the spool spindle;

FIGURE 7 illustrates the placement of titles on the combined pull and title strip.

My film magazine, as disclosed herein, is adapted for use with a hand viewer such as disclosed and claimed in my co-pending application Serial Number 353,347, filed March 20, 1964. It is to be understood, however, that it is also suitable for use in stereo and other projectors or viewers.

In FIGURE 5 I have shown the two parts of the housing separated from the spool to illustrate the manner in which the spool is assembled. The housing member consists of two substantially U-shaped members 10 and 12 adapted to be interdigitated with the spool 14 held therebetween to form a substantially rectangular housing. The legs 16 and 18 of member 12 form the top and bottom respectively of the housing and the connecting portion 20 forms one of the side walls. The other three side walls of the housing are formed by the portions 22, 24 and 26 of member 10. Spool 14 is formed as a hollow spindle 28 having guiding flanges 30 and 32 respectively adjacent opposite ends. Cylindrical portions 34 and 36 extend axially beyond flanges 30 and 32 respectively to form journal portions for engagement with similarly shaped openings 38 and 40 in the top and bottom walls 16 and 18 respectively. Portions 16 and 18 have dovetailed shaped tongues 42 and 44 which fit into correspondingly shaped recesses 46 and 48 respectively in side wall 24 to lock the housing members 10 and 12, with the reel 14 journalled in openings 38 and 40, in assembled relationship. The particular dovetailed arrangement here shown should be regarded as representative only for any suitable means may be used to detachably secure the members 10 and 12 together.

The reel 14 has wound thereon a coil of composite material consisting of a combined title and pull strip 50 and the strip of stereoscopic transparencies 52. Strip 50 is secured to spindle 28 by suitable adhesive means 54 while film strip 52 is secured to the underside of strip 50 by suitable adhesive means 56. An indicating mark 58 is positioned on strip 50 as a guide means for mounting strip 52 for a purpose that will be hereinafter more fully explained.

Spindle 28 is provided with an axial bore 60 therethrough in which is axially slidably mounted a rewind shaft 62 so that it may extend out from either end of the spool. Rewind shaft 62 is connected to spool 14 by a one-way clutch mechanism so that the spool can be rotated only in a direction to wind the strips 50 and 52 onto the spool. This eliminates possibility of damage to the film by rewinding in the wrong direction. As here shown the clutch consists of a series of cut out portions 64 extending the length of the axial bore 60. These cut out portions are provided with radial shoulders 66 for engagement with spring fingers 68 extending through slots 70 in rewind shaft 62. As will be clearly seen from FIGURE 3, spindle 28 can only be rotated by shaft 62, through the one-way clutch, in a counter clockwise direction i.e. to wind the strip material onto the spindle 28. The particular clutch means shown is by way of example only, it being understood that any suitable well-known clutch means may be substituted therefor.

To insure that the strip material is wound tightly on spindle 28 spring 72 is mounted in the housing for tensioned engagement with the strip material. As shown in FIGURES 2 and 3 this spring consists of a single piece of spring wire, the ends 74 and 76 of which are journalled in openings in the top 16 and bottom 18 respectively of member 12. Extending from end portions 74 and 76 are parallel arms 78 and 80 which extend laterally and radially to engage the wound strip material and are then bent back upon themselves and connected by a cross piece 82 which engages the inner surface of side wall 20. It will be apparent from FIGURE 2 that the arms 78 and 80 engage the edges only of the strip material and do not come in contact with the central portion containing the transparencies. Thus scratching of this portion of the film is avoided.

As clearly shown in FIGURES 1 and 3, strip 50 extends outside the housing through a slot 84 which is located at the junction of side walls 20 and 22 while film 52 extends through a slot 86 located in wall 26 at the junction of this wall with wall 20. The end of film strip 52 has a cut out portion 88 and end wall 26 is provided with an inturned flange 90 so that when film strip 52 is in the fully retracted position as shown in full lines in FIGURE 3 the end will rest on the flange 90 and will not be withdrawn completely into the housing. In this position it can be easily transported out of the housing by pulling the strip 50 in the direction of arrow 92. The end of strip 50 is provided with a bar 94 suitably secured thereto by overlapping tabs 96. The central portion of the bar is adapted to be engaged by suitable actuating means in the viewer to withdraw the strip from the housing while the ends 98 extend laterally beyond the strip to engage the edge of the top and bottom walls 16 and 18 respectively to prevent the free end of strip 50 from being drawn into the housing as it is rewound by shaft 62. Since the stop bar accurately locates the film and pull strip in the fully retracted position, only the wall 26 need be transparent for viewing of the initial title of the complete film if desired, the other walls being opaque to protect the film from unnecessary exposure to light.

As previously stated the particular magazine described is designed for use in the stereo film strip viewer described in my copending application. Briefly stated this viewer includes an optical system for viewing a pair of stereo film transparencies with means for advancing the film in stepped sequences to bring other transparencies into view. The same advancing means operates the combined pull and title strip as well as a hinged mirror which is utilized to expose a title in viewing position just prior to exposing the corresponding mated pair of film transparencies in the optical viewing system. It is, therefore, apparent that the titles 100 on the strip 50 must be indexed with respect to the transparencies 102 on the film 52. This is accomplished by determining the required distance between titles and providing an indexing mark 58 on the strip 50 to indicate the positioning of the end transparency with respect to the strip 50. In assembling the strips 50 and 52 the transparency 102 is matched with the index mark 58 and the strip 52 is secured to strip 50 by adhesive means 56. The composite strip is then secured to and wound on the spool and the spool inserted in the housing.

It is understood that minor variation from the form of the invention disclosed herein may be made without departure from the spirit and scope of the invention, and that the specification and drawings are to be considered as merely illustrative rather than limiting.

I claim:

1. A film magazine comprising:
   a separable, two-part housing having generally parallel, substantially rectangular top and bottom walls, and connecting side walls;
   a spool, having a hollow spindle and spaced side flanges, journalled in said top and bottom walls;
   a combined pull and title strip wound on said spindle, one end of which is secured to the spindle;
   said housing having a slot therein adjacent the junction of contiguous side walls;
   the other end of said strip extending through said slot; and
   securing means on said strip adjacent said one end for attachment of a film strip thereto.

2. The combination of claim 1 further including a rewind shaft axially slidably mounted in said hollow spindle and extensible from either end of the spindle and a one way clutch connection between said rewind shaft and said spindle whereby rewinding by both left and right hand users is facilitated.

3. The structure of claim 1, said housing having a second slot therein and a guide flange adjacent said second slot for supporting the end of a film strip, wound on said spindle coextensively with said pull and title strip, when said combined pull and title strip is fully wound into the magazine.

4. The structure of claim 3 and including a spring in said housing having arms adjacent said top and bottom walls to engage the edges of strip material on said spool, said arms extending toward the second mentioned slot to separate and guide a film strip wound coextensively with said pull and title strip, outwardly through the second slot.

5. A film magazine comprising:
   two substantially U-shaped interdigitating members forming a separable housing having top, bottom and side walls;
   a spool journalled in said top and bottom walls;
   one of said side walls having a first slot;
   a combined pull and title strip wound on said spool, one end of which is secured to said spool and the other end of which extends through said first slot;
   securing means on said pull and title strip adjacent said one end for attachment of a film strip thereto; and
   one of said side walls having a second slot through which a film strip can pass.

6. The structure of claim 5 and including a spring in said housing having arms adjacent said top and bottom walls to engage the edges of strip material on said spool, said arms extending toward said second slot to separate and guide a film strip, wound on said spool coextensively with said pull and title strip, outwardly through the second slot.

7. The structure of claim 5 and including stop means on said other end of said pull and title strip, comprising a bar secured transversely to the strip and projecting beyond the edges thereof, a portion of the strip being cut out intermediate the edges to expose a portion of said bar.

8. The structure of claim 5 and including title receiving frames on said pull and title strip spaced to correspond with the frames of a film strip attached thereto, and indicating means on said pull and title strip adjacent said securing means to guide the positioning of a film strip relative to said title receiving frames.

9. A film magazine comprising:
   two substantially U-shaped interdigitating members forming a separable rectangular housing having top, bottom and side walls;
   a spool, including a hollow spindle and spaced flanges, journalled in said top and bottom walls;
   a combined pull and title strip wound on said spool, one end of which is secured to said spool and the other end of which extends outside the housing;
   a film strip having a series of stereoscopic transparencies, the inner end of which is secured to the radially inner side of said combined pull and title strip in predetermined relationship thereto at the inner end thereof; said housing having a slot therein at the intersection of two adjacent side walls, said other end of said combined pull and title strip extending through said slot;
   a combined stop and actuating means secured to said other end;
   said housing having a second slot therein spaced from said first slot, said film strip extending through said second slot as said pull strip is unwound from said reel;
   a rewind shaft axially slidable in said hollow spindle; and a one way clutch between said rewind shaft and said hollow spindle.

References Cited by the Examiner
UNITED STATES PATENTS

| | | | |
|---|---|---|---|
| 874,130 | 12/1907 | Stanley. | |
| 948,506 | 2/1910 | Horton | 40—82 |
| 1,304,867 | 5/1919 | Floyd | 74—547 |
| 1,445,426 | 2/1923 | Weigand | 206—52 |
| 1,450,446 | 4/1923 | Nelson. | |
| 1,476,604 | 12/1923 | Foreman. | |
| 1,944,395 | 1/1934 | Bell. | |
| 2,731,894 | 1/1956 | Leitz et al. | 242—71.7 X |
| 2,935,190 | 5/1960 | Braun | 206—52 |

MERVIN STEIN, *Primary Examiner.*

W. S. BURDEN, *Assistant Examiner.*